Aug. 17, 1954     F. W. HOBAN     2,686,588
ACTUATING MEANS FOR ENDLESS CONVEYERS
Filed March 19, 1952     4 Sheets-Sheet 1
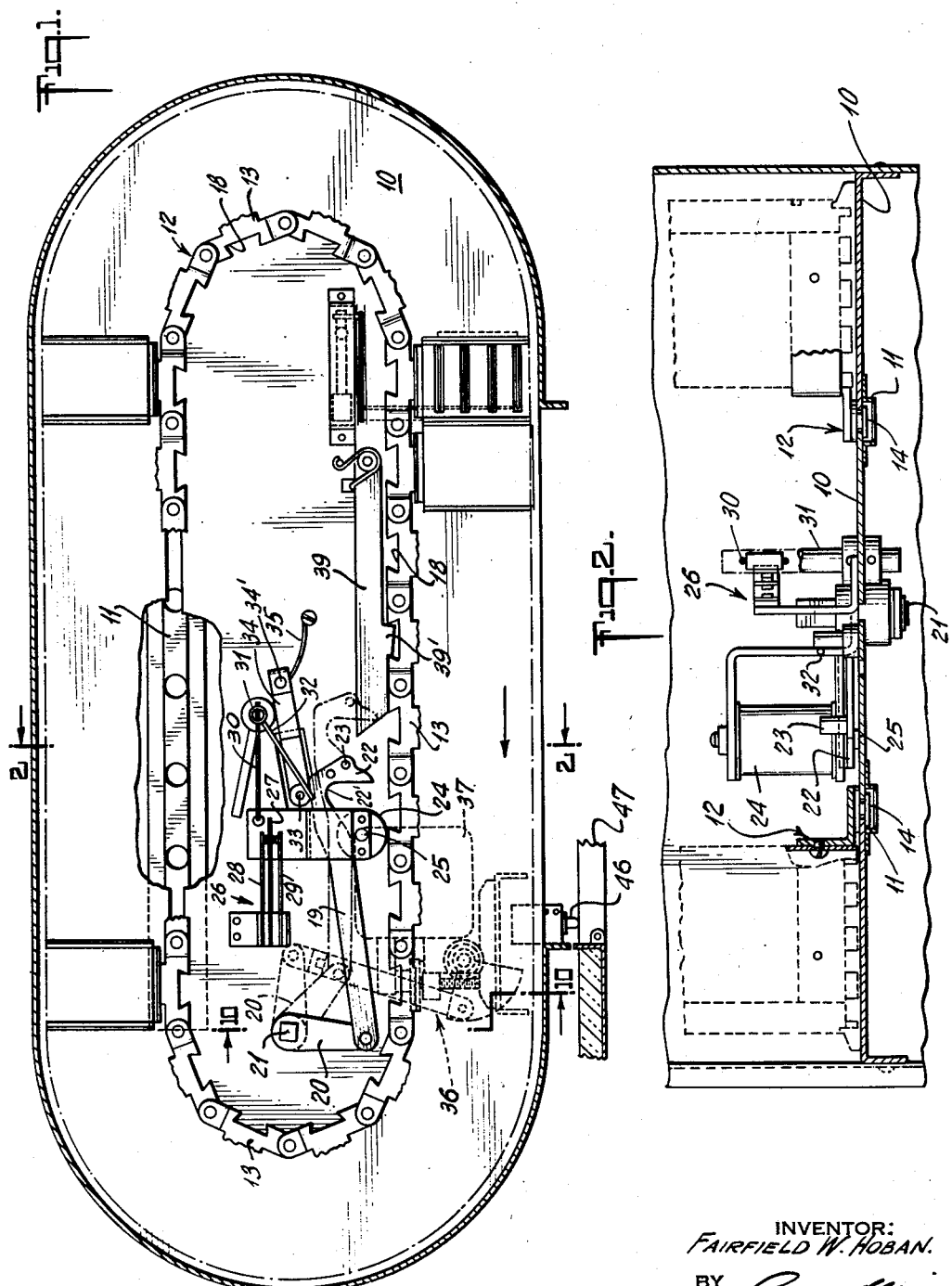
INVENTOR:
FAIRFIELD W. HOBAN.
BY
ATTORNEY:

Aug. 17, 1954    F. W. HOBAN    2,686,588
ACTUATING MEANS FOR ENDLESS CONVEYERS
Filed March 19, 1952    4 Sheets-Sheet 2
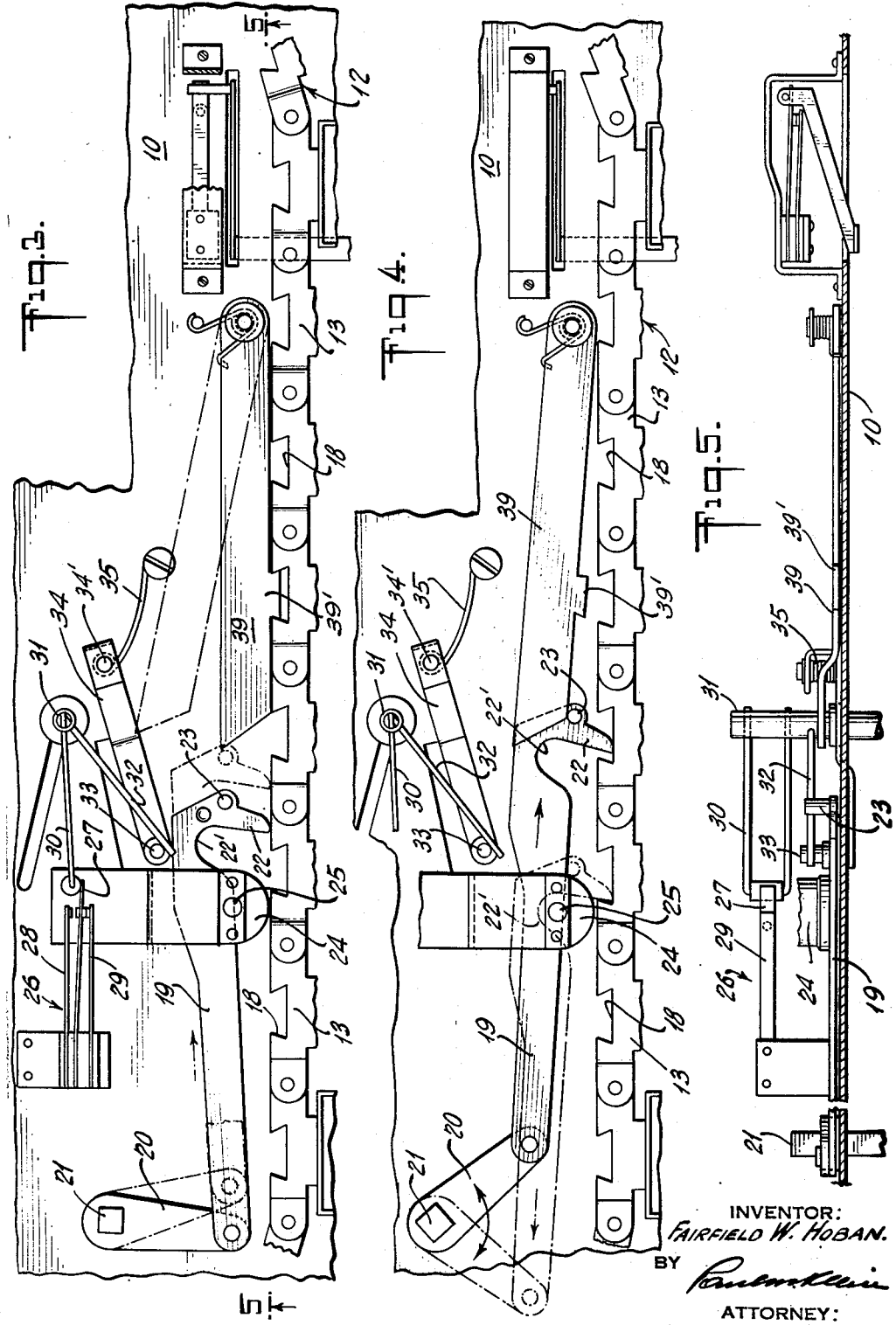
INVENTOR:
FAIRFIELD W. HOBAN.
BY
ATTORNEY:

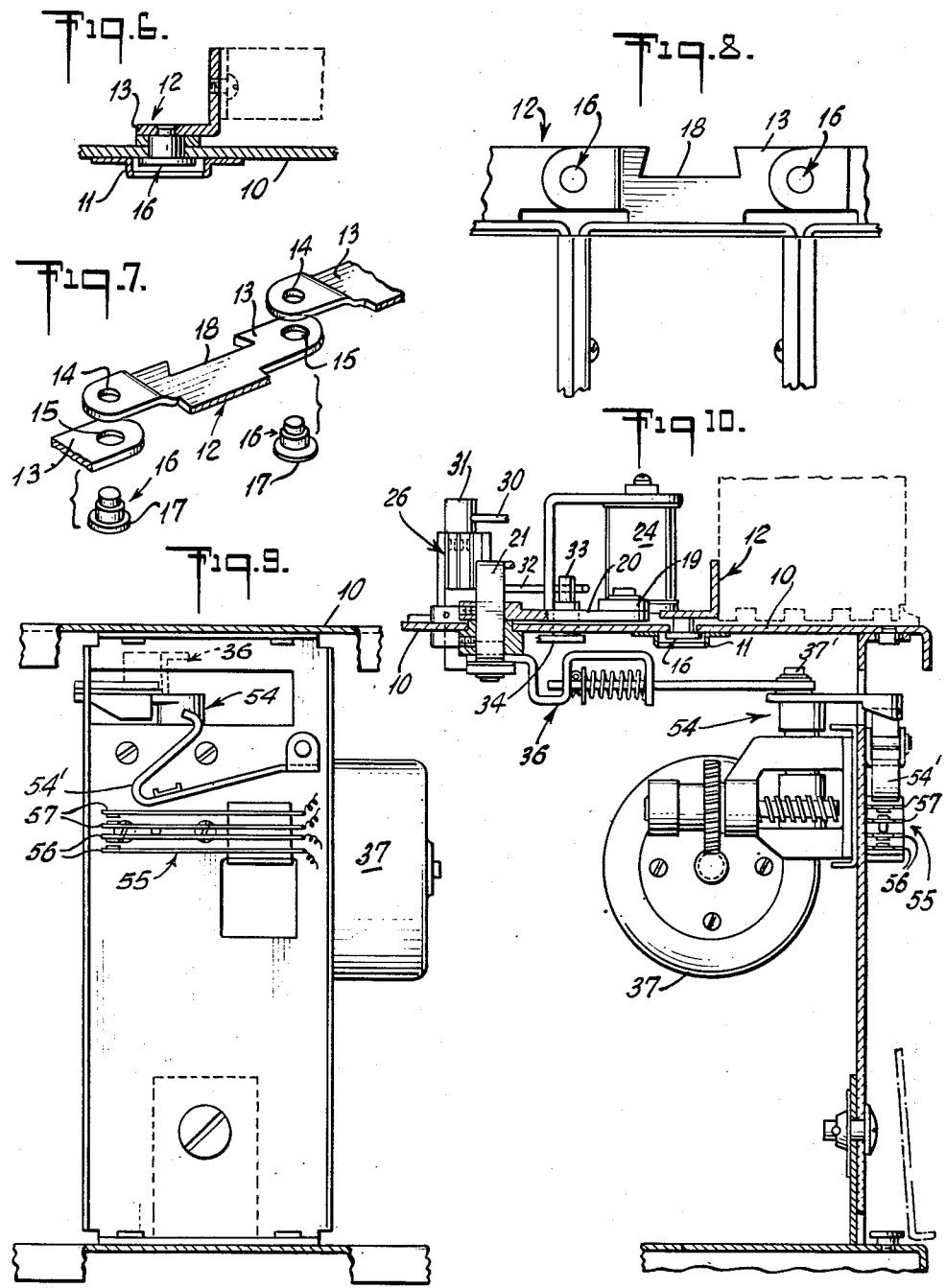

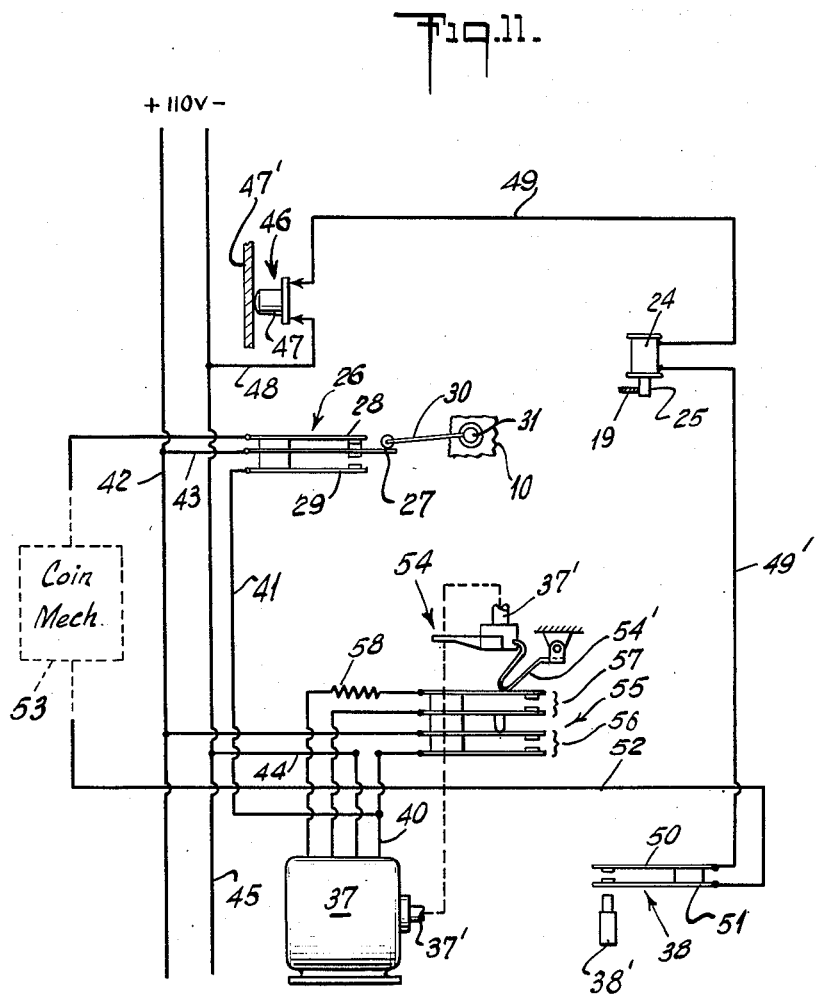

Patented Aug. 17, 1954

2,686,588

UNITED STATES PATENT OFFICE 2,686,588

ACTUATING MEANS FOR ENDLESS CONVEYERS

Fairfield W. Hoban, Babylon, N. Y., assignor to Norman Cogliati, Newark, N. J., John F. Hoban, New York, and J. Russell Callahan, Plandome Manor, N. Y., as trustees Application March 19, 1952, Serial No. 277,430

7 Claims. (Cl. 198—135)

This invention relates generally to endless conveyers and means for operating same, and pertains to a conveyer arrangement such as disclosed in my copending application Serial Number 225,737, filed May 11, 1951, for Vending Machines, this application being a continuing case of the latter.

Endless article conveyers of the type indicated in the aforesaid application have the purpose to facilitate the successive movement of articles to a certain discharging position, but obviously the combination conveyer and actuating facilities therefor may be employed in a great many other fields. For that reason the present application is intended to cover the structure of an endless conveyer and its actuating means, which latter are designed to successively or periodically move the conveyer certain predetermined distances, such as the length of a chain link, when the conveyer is composed of a series of such links.

It is the prime object of this invention to provide the combination with an endless conveyer of actuating means therefor, adapted to successively move the conveyer a predetermined distance each time said actuating means are operated.

A more specific object of this invention is the provision of actuating means for an endless conveyer which are adapted for reciprocal movements in two opposite directions, that is, first moving in a direction counter to that intended for the conveyer and then in the direction of the intended movement thereof.

A further object of this invention is the provision of a combination endless conveyer and actuating means, wherein said conveyer is composed of a plurality of interconnected links and wherein each of the links is provided at one face, side or edge thereof with engageable means, such as a recess, projections or similar structures adapted for periodical engagement by said actuating means to impart successive but limited movements to said conveyer, said actuating means being adapted for alternately engaging and moving the conveyer, and thereupon releasing the conveyer upon completion of each movement.

A further object of this invention is the provision, in conjunction with such actuating means, of a spring-loaded element normally adapted to urge said actuating means towards said conveyer and other, electrically operated means for either causing said actuating means to assume an idling position at a distance from said conveyer, or to release said actuating means into engagement with the conveyer for moving it, and additional means for operating said actuating means in either its idling or conveyer-engaging positions.

The foregoing and a number of additional objects and important advantages of the present invention will become more fully apparent from the ensuing description in conjunction with the accompanying drawings, which latter illustrate but one of the many possible embodiments of the instant disclosure, and wherein:

Fig. 1 is a plan view of a link conveyer and its actuating means, the latter being shown in its idling, link-disengaging position;

Fig. 2 is an enlarged section taken approximately along lines 2—2 of Fig. 1;

Fig. 3 is a fragmental plan view of the conveyer and its actuating means in a link-contacting position;

Fig. 4 is a similar fragmental plan view to that shown in Fig. 3 with the conveyer-actuating means in operative engagement with one of the conveyer links;

Fig. 5 is a vertical cross section taken approximately along lines 5—5 of Fig. 3;

Fig. 6 is a vertical cross sectional detail view through one of the conveyer links and its guide means;

Fig. 7 is a perspective exploded view of a conveyer link and the ends of two adjacent links;

Fig. 8 is a top view of a conveyer portion;

Fig. 9 is an elevation of the mounting for a switch arrangement and motor for operating said actuating means;

Fig. 10 is a fragmental vertical section through such mounting and disclosing the motor, the operating mechanism for the conveyer-actuating means and other instrumentalities in cooperation with the latter; and Fig. 11 is a wiring diagram showing the major electrical control means governing the operation of said conveyer-actuating means.

In the figures, numeral 10 denotes a platform provided with conveyer guide means 11 (see Figs. 1, 2, 6 and 10), in which is operatively mounted a link chain conveyer 12 adapted to be moved in one, say clockwise direction, indicated by the arrow in Fig. 1.

As disclosed in Fig. 7, each of the links 13 of the conveyer is provided with end openings 14 and 15 for the reception of rivets 16 or the like which are adapted to pass through the openings 15 to be fixedly fastened in openings 14. Rivets 16 are preferably equipped with flanges 17 adapted to be guided in guide channel 11 of the platform, as is clearly seen from Fig. 6. Each of the links 13 is provided with a recess 18 along one of its edges or sides.

The actuating means for the conveyer comprises a one-armed, substantially hook-shaped lever 19, one end of which is pivotally engaged by a crank or lever 20 which is operated by means of a vertical shaft 21. The free end of the actuating lever terminates in a hook formation 22 which is adapted to engage recesses 18 of the conveyer links when the conveyer is to be operated. From the hook formation 22 of the lever extends a pin 23, the purpose of which will be explained presently.

Above lever 19 there is mounted solenoid 24 provided with an operative armature 25, which latter, when the solenoid is energized, is held above the lever 19, but will descend into the path of operation of the lever when the solenoid becomes de-energized.

In rear of the solenoid there will be observed a double contact switch 26 (see Fig. 1), consisting of three blades equipped with two pairs of contacts. There is a long middle blade 27 and two shorter outer blades 28 and 29. It will be noted that switch 26 in its normal position shown in Fig. 1 has its two upper contacts closed, whereas its two lower contacts are open. Long switch blade 27 is adapted to be engaged by a switch-operating lever 30 which extends from a vertical shaft 31, the latter being operated by means of a bar 32 engageable by a pin 33 extending from a spring-loaded, one-armed lever 34, pivotally mounted at 34'. A spring 35 presses lever 34 against conveyer-actuating lever 19, thus normally urging the latter towards the conveyer chain.

Solenoid 24 being normally de-energized, its armature is released against platform 10 and thus holds chain-actuating lever 19 in its conveyer-clearing or idling position shown in Fig. 1. While dropped armature 25 keeps lever 19 in that position, the latter prevents lever 34 from moving in response to the action by spring 35; thus pin 33, bar 32 and arm 30 are retained in their inoperative position at which switch blades 27 and 28 contact.

Operating shaft 21 for crank 20 is intended to swing the latter first from its full-line starting position shown in Fig. 1 to its full-line end position seen in Fig. 4, and then to its opposite end position indicated in broken lines in that figure, and back again until it reassumes its starting position.

That movement to the shaft 21 is imparted by a linkage 36 (see Figs. 1 and 10), operated by motor 37, which latter is controlled by the two normally open contacts secured to blades 27 and 29 of switch 26. The operation of solenoid 24 is controlled by a manually actuated switch indicated at 38 in Fig. 11.

Referring again to Figs. 1, 3 and 4, there will be noted a spring-loaded detent lever 39 which is intended to engage with its extension 39' the recess 18 of one of the links to prevent inadvertent movement of the chain conveyer until such movement is actually desired.

Electric diagram

It will be noted in Fig. 11 that motor 37 is connected by leads 40 and 41 to the lower blade 29 of switch 26. The middle long blade 27 thereof is connected to main line 42 by way of connection 43. A lead 44 connects main line 45 with one terminal of the motor. In the upper left corner of Fig. 11 there is shown a holding switch 46 which is intended to be closed by button 47, held in its closing position by, for instance, the closed door 47' of a vending machine. Lead 48 extends from main line 45 to switch 46 and a lead 49 passes from that switch to solenoid 24, and from the latter lead 49' extends to the upper blade 50 of switch 38, whereas the lower blade 51 thereof is connected by lead 52 via coin control 53 to upper switch blade 28 of switch 26 and through middle switch blade 27 to main line 42. Switch 38 is manually operable by button 38' and is normally open.

Controlled by the movement of shaft 37' of motor 37 is a cam arrangement 54 adapted to actuate by means of a hingedly suspended pressure lever 54' a double switch 55. That switch constitutes a combination holding and resistance-controlling switch for the motor. The lower pair of blades 56 are intended, when compressed, to establish direct connection from main lines 42 and 45 to the motor, while contact blades 57, when compressed, will place into the field winding of the motor a resistance 58 intended to slow down the speed of the motor.

Operation

When button 38' of switch 38 is depressed to cause blades 50 and 51 to contact, solenoid 24 (shown in Figs. 1 to 4 and Figs. 10 and 11) becomes energized and attracts armature 25 and elevates it above lever 19, thus releasing the lever to swing from its full-line position shown in Fig. 1, to its full-line position shown in Fig. 3, at which position of the lever its hook-shaped end 22 comes to rest against the interior edge of one of the links.

Lever 19 is moved to its full-line position shown in Fig. 3 by the force of spring-loaded lever 34, whereby bar 32 is forced by pin 33 to the position shown in Fig. 3. That movement of bar 32 causes switch-operating arm 30 to move middle blade 27 of switch 26 away from blade 28 and into contact with blade 29, whereby the circuit controlled by coin mechanism 53 is opened and the motor circuit is closed, respectively. Thus motor 37 becomes energized and commences to operate shaft 21, which latter moves crank 20 from its full-line starting position seen in Fig. 3, towards its full-line end position shown in Fig. 4, whereby lever 19 will first glide along the edge of one of the conveyer links from its starting position toward its dotted-line position (see Fig. 3), and as the lever progresses, its pin 23 will engage detent 39 so that the latter's extension 39' is caused to disengage the conveyer (see Fig. 4). When lever 19 assumes its end position shown in Fig. 4, it is forced by spring-loaded lever 34 into and operatively engages the link recess adjacent to that just disengaged by extension 39' of detent 39.

As the motor continues to operate linkage 36, and thereby shaft 21, crank 20 moves lever 19 to its broken-line end position seen in Fig. 4, thereby propelling conveyer 12 for the distance of one link length. While lever 19 moves to that broken-line end position, its pin 23 releases detent 39 into engagement with the recess of the next chain link, thus preventing movement of the conveyer, while lever 19 is being brought back by crank 20 to its starting position shown in Fig. 1.

Meantime push button 38' has been released, thereby opening switch 38, thus causing solenoid 24 to become de-energized; consequently armature 25 drops toward platform 10. In observing Fig. 4, it will be noted that as lever 19 reaches its broken-line end position, the recessed portion 22' of its hook formation 22 assumes a position directly beneath armature 25, so that the latter comes to rest against platform 10.

As crank 20 moves lever 19 toward its starting position, seen in Fig. 1, the lever's edge facing the conveyer engages dropped armature 25, the latter causing the lever to assume its full-line, starting or idling position shown in that figure. As long as armature 25 remains in its released position in contact with the platform, lever 19 is kept in its inoperative, starting or idling position. Thus while shaft 21 may move lever 19 to the right or left, its hook 22 can not engage the conveyer links.

When lever 19 is brought to its idling position by the dropped armature, the lever edge remote from the conveyer causes spring-loaded lever 34 to reassume its normal position shown in Fig. 1, at which pin 33 of that lever releases bar 32 so that operating arm 30 frees blade 27 into contacting position with blade 28, while contact between blades 27 and 29 is broken.

Without the provision of holding switch 56 of switch device 55 the opening of the circuit controlled by switch blades 27 and 29 of switch 26 would stop the operation of the motor and thus the completion of the operating cycle of lever 19.

Before blades 27 and 29 become separated and as the motor is about to complete its run, cam 54 of the motor drive (see Figs. 9, 10 and 11) depresses switch-actuating pressure lever 54', thereby simultaneously closing the blades of both switches 57 and 56. As switch 57 is closed, resistance 58 is introduced into the field winding of the motor, thus slowing down the latter's end run speed. Switch 56 constitutes a holding switch and, when closed, supplies current to the motor prior to the opening of switch blades 27 and 29, and while the latter remain open, until the operating cycle of lever 19 is completed.

As the motor is approaching its end revolutions, cam 54 disengages pressure lever 54', thereby releasing switch structure 55 and causing switches 57 and 56 to open, thus de-energizing the motor. At that moment lever 19 reassumes its starting position shown in Fig. 1, the entire mechanism is again ready for another operating cycle.

Fig. 11 discloses that the circuit controlled by switch blades 27 and 28 of switch 26 and by push-button switch 38 is also governed by the coin mechanism 53; therefore the latter must be made ready first by the insertion of a coin before the closing of switch 38 will cause solenoid 24 becoming energized to start a new operating cycle of the device.

While in the foregoing a specific construction of the conveyer moving mechanism and of a chain conveyer is described, it is quite obvious that structural changes may be necessitated by the application of both the conveyer and its moving mechanism when employed in connection with various devices. Thus, for instance, the provision of recesses in the links may be substituted by extensions projecting beyond the edges of the links, and lever 19 may be accordingly modified for engaging such extensions or projections. Such changes and similar modifications being obvious, specific illustrations and description of modified structures are omitted but are deemed to reside within the scope of this invention, as defined in the annexed claims.

What is claimed as new is:

1. The combination with an endless conveyer, of reciprocating, electrically controlled conveyer actuating means movable for predetermined distances first opposite to and then in the direction of the intended movement of the conveyer, and electro-mechanical means for effecting that movement of said actuating means, said conveyer being composed of interconnected links, each link having an engageable recess, said actuating means comprising a reciprocatingly operable lever, one end of which being adapted to engage a link recess when the lever is moved in the direction of the intended conveyer movement.

2. The combination with an endless conveyer, of actuating means therefor, said conveyer and said actuating means having cooperating means to facilitate their interengagement when said actuating means is to impart movement to the conveyer, electro-mechanical operating means for said actuating means, the latter being adapted to alternately engage and move the conveyer in one direction and to retrace its movement in opposite direction while the conveyer is at a standstill, and electrically controlled means adapted, when de-energized, to normally keep said actuating means in conveyer-disengaging position and, when energized, to allow said actuating means to assume its conveyer engaging position, and electro-mechanically controlled spring-loaded means adapted to normally urge said actuating means toward its conveyer engaging position.

3. The combination with an endless conveyer as in claim 2, said cooperating means of said conveyer and of said actuating means comprising, respectively, recesses in said conveyer and a recess-engaging structure forming a part of said actuating means.

4. The combination with an endless conveyer, of conveyer actuating means for periodically engaging and moving the conveyer successively for predetermined distances in one direction, and being adapted to disengage the conveyer and to move in opposite direction; electrically controlled means for either facilitating or preventing the engagement of the conveyer by said actuating means, and electrically controlled means for operating said actuating means, said conveyer being composed of interconnected links, each link having an engageable recess, said actuating means comprising a reciprocatingly operable lever, one end of which being adapted to engage a link recess when the lever is moved in the direction of the intended conveyer movement.

5. The combination with an endless conveyer composed of interconnected links provided with engageable means at one of their sides or edges only, of an actuating member for said conveyer adapted to successively coact with said engageable means to effect periodic, limited movements of the conveyer in one direction, said actuating member comprising a device adapted for reciprocal movements in two opposite directions, a linkage for imparting those movements to said member, and means for operating said linkage, said engageable means of the links comprising recesses, said actuating member consisting of a one-arm lever held pivotally at one end, its free end terminating in substantially a hook formation, the latter being adapted to successively engage and free the engageable means of said links; said means for operating said linkage comprising an electric motor; resilient means for normally urging said actuating member toward said conveyer; an electrical unit in cooperation with said actuating member adapted, when de-energized, to cause said member to assume a conveyer-disengaging position, a push-button switch controlling said electrical unit; a switch having two pairs of contacts, one pair of the contacts being normally closed, the other pair being normally open, said latter pair serving, when closed, to energize said motor; operating means for said switch in cooperation with said conveyer actuating member for opening that one contact pair and closing the other contact pair to energize said motor when said actuating member is released into engagement with the conveyer as said electrical unit becomes energized.

6. In a combination endless conveyer and actuating means therefor, the latter adapted to successively engage and move the conveyer a predetermined distance in one direction and thereupon to release the conveyer and to move in opposite direction prior to reengaging and moving the conveyer; said conveyer comprising a chain of interconnected links having engageable portions; said actuating means comprising a reciprocatingly operative element provided with an end structure adapted to first engage and move the chain, by way of said engageable portions of the links, and release the chain; a motor and a linkage driven by the latter for operating said actuating means; a detent for normally engaging one of the chain links to render the chain inoperative; the end structure of said actuating means having provision for causing said detent to release the chain prior to the latter's engagement and movement by the actuating means; a solenoid, an armature operable therein, the latter being adapted to cooperate with said actuating means, a switch for said solenoid and controlling the operation of said armature, a double-contact switch having one pair of normally closed contacts and another, normally open contact pair, the latter forming a part of an electric circuit for energizing the motor and when closed causing the motor to operate; a spring-loaded lever in engagement with said actuating means and controlling the operation of said double-contact switch and normally urging said actuating means toward said chain; said armature, when said solenoid remains de-energized, assuming a position in the operating path of said chain actuating means, thereby causing the latter to assume a chain-clearing or idling position; said armature releasing said actuating means to its chain-engaging position when said solenoid becomes energized, said spring-loaded lever, at that position of the actuating means, opening the normally closed contact pair and closing the normally open contact pair, thereby causing the motor to operate; a cam-controlled holding switch for the motor circuit adapted to supply current to the motor prior to and after opening of the normally closed contact pair as said actuating means assumes its idling position.

7. In a combination endless conveyer and actuating means therefor, a chain of interconnected links, an endless guide for the chain, each of the links having a recess along one edge or side thereof, an actuating lever for the chain adapted to successively engage the link recesses and to move said chain for the distance of one link length at one time and to disengage the chain after completion of each chain movement, and means for operating said lever, said lever operating means comprising an electric motor and a linkage, one end of the lever being pivotally associated with the linkage; a solenoid with a movable armature disposed above and being adapted to cooperate with said lever; a manual switch for said solenoid; a double-contact switch having a pair of normally closed contacts and another pair of normally open contacts, the latter contacts when closed serving for energizing said motor; switch-operating means for opening the normally closed contacts and for closing the normally open contacts; a spring-loaded element controlling the switch-operating means and normally urging said chain-actuating lever toward said chain; said solenoid armature, when released by the de-energized solenoid, causing said actuating lever to assume an idling, chain-disengaging position, and, when the solenoid becomes energized, to release the lever to its chain-engaging position; said lever, while held in its idling position, causing said switch-operating means to release said double contact switch to its normal position.

References Cited in the file of this patent

UNITED STATES PATENTS

| Number | Name | Date |
| --- | --- | --- |
| 1,404,331 | Twer | Jan. 24, 1922 |
| 1,934,835 | Weiss | Nov. 14, 1933 |
| 2,529,777 | McInnis | Nov. 14, 1950 |
| 2,620,060 | Bird | Dec. 2, 1952 |